March 21, 1967 J. J. CATALFIMO 3,310,302
CLAMPING DEVICE
Filed May 21, 1964
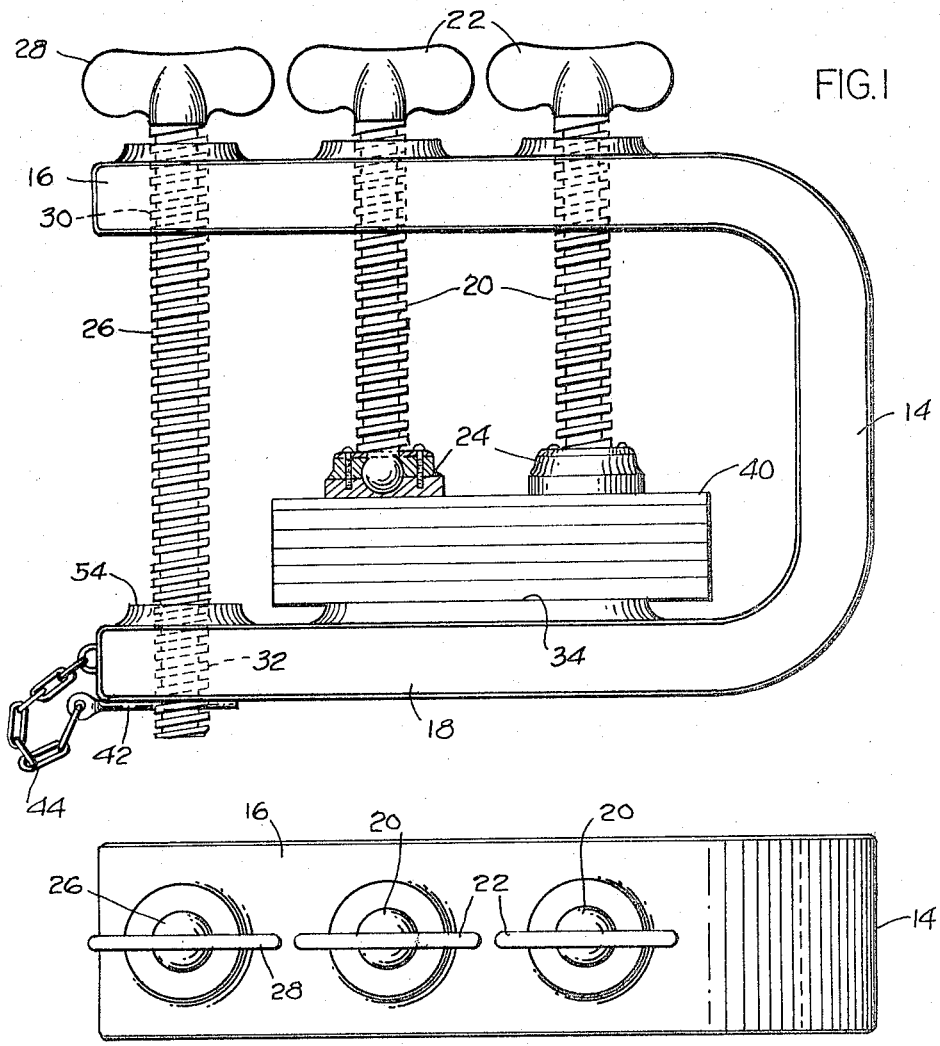
FIG. 1
FIG. 2
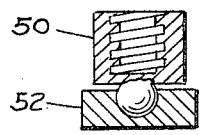
FIG. 3
INVENTOR:
JOSEPH J. CATALFIMO
BY, Robert R. Churchill
ATTORNEY

3,310,302
CLAMPING DEVICE
Joseph J. Catalfimo, 22 Dartmouth St., Boston, Mass. 02116
Filed May 21, 1964, Ser. No. 369,169
5 Claims. (Cl. 269—154)

This invention relates to a clamping device.

The invention has for an object to provide a novel and improved clamping device which is simple in structure and efficient in use.

With this general object in view and such others as may hereinafter appear, the invention consists in the clamping device as hereinafter described and particularly defined in the claims at the end of this specification.

In the drawings illustrating the preferred embodiment of the invention:

FIG. 1 is a view in side elevation of a clamping device embodying the present invention;

FIG. 2 is a plan view of the same; and

FIG. 3 is a cross sectional detail view of a part adapted for use with the present clamping device.

In general, the present invention contemplates a novel clamping device in the nature of a C-clamp and comprises an improvement in this type of clamp. While the present clamp is designed for any of the various uses of a C-clamp, the present clamping device is particularly adapted for use in the building and construction trades where, for example, an elongated metal beam is to be hoisted into position. In use the present clamp may be applied to a medial portion of such beam, and in practice, a crane hook attached to a cable may be hooked into the looped or closed end of the clamping device whereupon the beam is lifted into place by the crane. It will be apparent that any failure of the clamp to hold the work, as by spreading apart of the leg of the clamp, will cause the work to slip out of the clamp and possibly cause an accident.

In accordance with the present invention the clamp is provided with a locking screw for maintaining the free ends of the clamp in uniform spaced relation so as to prevent spreading apart of the legs of the clamp when placed under clamping tension whereby the clamping screws will remain in tight clamping engagement with greater safety for the workman and the crane operator.

Referring now to the drawings, the present clamping device indicated generally at 10 comprises a C-shaped member indicated generally at 12 having a closed end 14 and horizontally extended upper and lower legs 16, 18. The upper leg 16 is provided with one or more spaced clamping screws 20 threadedly engaged in the leg. Each screw is provided with a winged gripping portion 22 at its upper end and is provided with a swivel foot 24 at its lower end for engagement with the work to be clamped.

The device is further provided with a locking screw 26 which is threadedly engaged with the outer ends of both the upper and lower legs 16, 18. The locking screw 26 is also provided with a winged gripping portion 28. The locking screw 26 thus assembled in the threaded openings 30, 32 in the upper and lower legs, respectively, serves to prevent the legs from spreading apart when the work is clamped in place by the clamping screws 20. The lower leg 18 is provided with a raised work-engaging surface 34 on its inner surface upon which the work indicated at 40 may be placed.

In operation, when the clamp is to be used for gripping heavy elongated building construction parts, such as a plurality of superimposed elongated narrow plates or sheets, as shown at 40, the locking screw 26 is first unscrewed to permit the clamp to be applied laterally of the work and medially of the length of the work. This expedient eliminates the necessity of applying the clamp over one end of the work and then moving the clamp to a medial position. The locking screw 26 is then engaged with the threaded opening 32 to join the ends of the legs 16, 18 to maintain them in fixed spaced relation by virtue of the threaded engagement with both legs. The work may then be tightly clamped to the work-engaging surface 34 by the screws 20.

With this construction it will be seen that the locking screw connection resists any tendency of the legs 16, 18 to spread apart, and substantial pressure may be applied against the work to firmly grip the same so as to eliminate any possibility of slipping of the work from the clamp as the work is lifted into position by the crane.

As illustrated it is preferred to use square or acme threads on the screws for maximum strength. While the screw threads themselves will serve to hold the legs 16, 18 in fixed relation to prevent spreading apart of the same under tension, a pin 42 may be extended through an opening in the lower end of the screw to serve as an additional safety to maintain the legs in fixed relation. The pin 42 may be carried by a chain 44 secured to the leg 18 as shown. In operation when the pin is used the locking screw is first screwed into the leg 18 to present the pin opening beyond the underside of the leg. The pin is then inserted, and the locking screw is backed up or unscrewed until the pin engages the underside of the leg. The clamp screws 20 may then be tightened up to full tension on the work.

The present clamping device may be made in different sizes to accommodate work of different widths. Also, when the work is of a width such as to extend beyond the locking screw 26, the latter may be adapted for use as an additional clamping screw by unscrewing the same from the lower leg 18 and applying to the end of the screw an adapter 50 having a swivel foot 52 at its lower end as shown in FIG. 3. It will be seen that a boss 54 provided on the inner face of the leg 18 above the threaded portion 32 is of the same height as the raised work-engaging face 34 to accommodate such wider work. In this condition the locking screw 26 may be used as an additional clamping screw for the work.

The present clamping device may also be used with advantage as a clamp for holding two parts together in alignment by clamping one of the parts against the work-engaging face 34 by means of a clamping screw 20 and clamping the second part against the raised boss 54 by means of the locking screw 26 provided with the adapter 50. Where two elongated parts are to be clamped together in alignment and in end-to-end abutting relation, the clamp will be applied diagonally of the parts to present the clamping screws one against each part.

From the above description it will be seen that the present clamping device may be used with advantage for clamping heavy building construction parts and which may be engaged by a hook carried by a crane for raising the parts into position. One of the advantages of this expedient is that it eliminates the use of a sling in hoisting heavy materials. A sling under a heavy strain may be liable to break. While the locking screw illustrated is provided with threads for its full length it will be obvious that the threads may be discontinued along a medial portion of the screw if desired. The winged gripping portion 22 may be changed by providing square heads or the like adapted to be engaged by a ratchet wrench for tightening the clamps and the locking screw, or for larger sizes a ring (not shown) secured to the head of the clamping screw may be used through which a bar may be inserted to rotate the screw. The expedient of using the pin 42 is particularly useful when worn threads ultimately result.

While the preferred embodiment of the invention has been herein illustrated and described, it will be understood that the invention may be embodied in other forms within the scope of the following claims.

Having thus described the invention, what is claimed is:

1. A clamping device comprising an integral C-shaped member having a closed end portion and upper and lower parallel legs, a plurality of clamping screws carried by said upper leg for clamping the work against the lower leg, and a locking screw adjacent the free ends of the legs passing through and threadly engaged with both legs for resisting any tendency of the legs to spread apart under clamping tension.

2. A clamping device as defined in claim 1 wherein the clamping and locking screws are provided with acme threads for maximum strength.

3. A clamping device as defined in claim 1 wherein each clamping screw is provided with a swivel foot, and the lower leg is provided with a raised work-engaging surface on its inner face.

4. A clamping device as defined in claim 1 wherein the lower end of the locking screw extends beyond the lower leg and is provided with a diametral opening, and a pin extended through said opening to engage the underside of said lower leg.

5. A clamping device as defined in claim 1 wherein the said screws are each provided with a winged gripping portion and the device is adapted for use as an aligning tool by clamping one part to be aligned by means of one clamping screw and clamping a second part to be aligned with the first part by means of a second clamping screw.

References Cited by the Examiner
UNITED STATES PATENTS

| | | | |
|---|---|---|---|
| 1,412,961 | 4/1922 | Periolat | 269—249 |
| 1,864,422 | 2/1932 | Hands | 269—249 X |
| 2,177,395 | 10/1939 | Thompson | 269—154 |
| 2,340,692 | 2/1944 | Ridd | 269—128 X |
| 2,440,820 | 5/1948 | Frank | 269—249 X |
| 2,525,204 | 10/1950 | Calabro | 269—287 X |

FOREIGN PATENTS 8,986   3/1880   Germany.

HAROLD D. WHITEHEAD, *Primary Examiner.*